United States Patent
Kim et al.

(10) Patent No.: US 10,584,976 B2
(45) Date of Patent: Mar. 10, 2020

(54) METHOD AND SYSTEM TO CONTROL VEHICLE BASED ON PREDICTING DESTINATION

(71) Applicants: HYUNDAI MOTOR COMPANY, Seoul (KR); KIA MOTORS CORPORATION, Seoul (KR)

(72) Inventors: Bogeun Kim, Seongnam-si (KR); Sung Hoon Bang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 15/615,616

(22) Filed: Jun. 6, 2017

(65) Prior Publication Data
US 2018/0172467 A1 Jun. 21, 2018

(30) Foreign Application Priority Data
Dec. 20, 2016 (KR) ........................ 10-2016-0174746

(51) Int. Cl.
*G01C 21/36* (2006.01)
*G08G 1/0968* (2006.01)
(Continued)

(52) U.S. Cl.
CPC ....... *G01C 21/3617* (2013.01); *F02D 41/027* (2013.01); *G01C 21/3484* (2013.01);
(Continued)

(58) Field of Classification Search
CPC .... G01C 21/34; G01C 21/3484; G01C 21/36; G01C 21/3605; G01C 21/3617;
(Continued)

(56) References Cited

U.S. PATENT DOCUMENTS 6,401,029 B1 * 6/2002 Kubota .............. G01C 21/3611
701/408
7,418,342 B1 * 8/2008 Bell ................... G01C 21/3617
340/995.19
(Continued)

FOREIGN PATENT DOCUMENTS

DE 102009047119 A1 * 5/2011
GB 2479196 A * 10/2011
(Continued)

*Primary Examiner* — Faris S Almatrahi
*Assistant Examiner* — David A Testardi
(74) *Attorney, Agent, or Firm* — Knobbe Martens Olson & Bear LLP

(57) ABSTRACT

Provided are a method and a system for controlling at least one feature of a vehicle based on a destination predicted when a driver of the vehicle does not input a specific destination to a navigation system of the vehicle. A driving pattern is determined using driving information of a vehicle. A driving model corresponding to the driving pattern among pre-stored driving models is determined. A destination of the determined driving model is identified as a prediction destination. Control signal corresponding to the prediction destination for controlling at least one feature of the vehicle is generated for performing a vehicle operation according to the vehicle control information.

10 Claims, 5 Drawing Sheets

(51) Int. Cl.
*F02D 41/02* (2006.01)
*G01C 21/34* (2006.01)

(52) U.S. Cl.
CPC ... *G01C 21/3605* (2013.01); *G08G 1/096888* (2013.01); *G08G 1/096894* (2013.01)

(58) Field of Classification Search
CPC .............. G01C 21/3697; G08G 1/0129; G08G 1/096888; G08G 1/096894; F02D 41/027; F02D 41/0275; F02D 41/0285; F02D 41/029

See application file for complete search history.

(56) References Cited

U.S. PATENT DOCUMENTS

| | | | | |
|---|---|---|---|---|
| 8,754,777 | B1* | 6/2014 | Mendis | G06F 1/28 340/286.14 |
| 9,682,624 | B1* | 6/2017 | Koebler | B60L 15/2045 |
| 2004/0128066 | A1* | 7/2004 | Kudo | G01C 21/3617 701/468 |
| 2005/0125148 | A1* | 6/2005 | Van Buer | G01C 21/3617 701/468 |
| 2005/0228553 | A1* | 10/2005 | Tryon | B60K 6/46 701/22 |
| 2005/0251325 | A1* | 11/2005 | Kudo | G01C 21/3484 235/472.01 |
| 2006/0173841 | A1* | 8/2006 | Bill | G01C 21/3407 |
| 2007/0010942 | A1* | 1/2007 | Bill | G01C 21/3617 701/424 |
| 2008/0262667 | A1* | 10/2008 | Otabe | B60W 10/06 701/22 |
| 2009/0319176 | A1* | 12/2009 | Kudoh | G01C 21/3617 701/408 |
| 2010/0036601 | A1* | 2/2010 | Ozawa | G01C 21/00 701/465 |
| 2010/0043404 | A1* | 2/2010 | Hebbale | F01N 9/00 60/286 |
| 2010/0094496 | A1* | 4/2010 | Hershkovitz | B60L 3/12 701/22 |
| 2011/0238289 | A1* | 9/2011 | Lehmann | G01C 21/3438 701/533 |
| 2011/0313957 | A1* | 12/2011 | Ide | G01C 21/20 706/12 |
| 2013/0218379 | A1* | 8/2013 | Filev | G01C 21/3617 701/22 |
| 2013/0345957 | A1* | 12/2013 | Yang | G06N 5/02 701/300 |
| 2015/0260074 | A1* | 9/2015 | Argolini | F01N 9/00 701/102 |
| 2015/0345970 | A1* | 12/2015 | Tanaka | G01C 21/3617 701/521 |
| 2015/0354978 | A1* | 12/2015 | Gerlach | G01C 21/3617 701/424 |
| 2016/0195405 | A1* | 7/2016 | Kreifeldt | G01C 21/3484 701/533 |
| 2016/0201533 | A1* | 7/2016 | Upadhyay | F01N 3/0232 701/102 |
| 2016/0377449 | A1* | 12/2016 | Gerlach | G01C 21/3617 701/424 |
| 2017/0072937 | A1* | 3/2017 | Kapadia | B60W 20/12 |
| 2018/0170349 | A1* | 6/2018 | Jobson | B60W 50/0097 |

FOREIGN PATENT DOCUMENTS

| | | | | |
|---|---|---|---|---|
| JP | 2003314250 | A * | 11/2003 | ........... F02D 41/029 |
| JP | 2008180624 | A * | 8/2008 | |
| JP | 4495620 | B2 | 7/2010 | |
| JP | 2011047818 | A * | 3/2011 | |
| JP | 4817070 | B2 | 11/2011 | |
| KR | 10-1543087 | B1 | 8/2015 | |

* cited by examiner

METHOD AND SYSTEM TO CONTROL VEHICLE BASED ON PREDICTING DESTINATION

CROSS-REFERENCE TO RELATED APPLICATION

This application claims priority to and the benefit of Korean Patent Application No. 10-2016-0174746 filed in the Korean Intellectual Property Office on Dec. 20, 2016, the entire contents of which are incorporated herein by reference.

BACKGROUND (a) Field

The present disclosure relates to a method and a system to control a vehicle based on predicting a destination.

(b) Description of Related Art

For convenience of a driver of a vehicle, techniques for predicting and setting a destination automatically without setting the destination separately have been developed. The technique is published in Korean Patent Registration No. 1,543,087. The patent 087 is a technique performed in a navigation installed in the vehicle, and a destination to arrive is predicted from stored destination information and the predicted destination is set by using an input date for setting the destination, a DB input date for the previously registered information, a time of requesting the destination, and the like.

When the destination is predicted even if the user drives without setting the destination separately, there is an advantage in that various information such as a use road for each time zone and a driving direction is predetermined to be provided to the driver, and there is an advantage to easily find the destination even if the user does not perform a lot of manipulations.

However, it is difficult to apply the related art to a user who does not use a navigation, that is, a user who uses a navigation function of a mobile, and the number of input times is small, but there is an inconvenience that a user needs to operate the navigation. Further, the related art is limited to simply setting a destination, and thus various information or services are not provided to the driver or the vehicle that drives without setting a destination.

The above information disclosed in this Background section is only for enhancement of understanding of the background of the invention and therefore it may contain information that does not form the prior art that is already known in this country to a person of ordinary skill in the art.

The disclosure of this section is to provide background of the invention. Applicant notes that this section may contain information available before this application. However, by providing this section, Applicant does not admit that any information contained in this section constitutes prior art.

SUMMARY

The present disclosure has been made in an effort to provide a method and a system to control a vehicle based on predicting a destination having advantages of predicting a destination for a driving vehicle without setting the destination and providing vehicle control information to perform an operation benefit to a driver or a vehicle while driving to the predicted destination based on various information obtained by predicting the destination.

The embodiments of the present invention may be used for achieving other objects which are not specifically mentioned other than the above object.

An embodiment of the present invention provides a method to control a vehicle based on predicting a destination, the method including: determining a driving pattern by using driving information received from a vehicle; determining a driving model corresponding to the driving pattern among pre-stored driving models; determining a destination of the determined driving model as a prediction destination; generating vehicle control information corresponding to the prediction destination; and performing a vehicle operation according to the vehicle control information by providing the vehicle control information to the vehicle.

The method may further include performing an operation of applying driving pattern information and the destination while the vehicle of the user arrives at the predicted destination to the pre-stored user driving model, learning the user driving model, and maintaining or changing the pre-stored user driving model corresponding to the corresponding driving pattern.

The method may further include determining a destination of which the number of visiting times is equal to or larger than the number of setting times for the set period as a first destination, determining a destination of which the number of visiting times is smaller than the number of setting times for the set period as a second destination, and distinguishing whether the destination included in the user driving model is the first destination or the second destination, when learning the user driving model.

The number of the setting times may be varied based on previous visiting records.

The vehicle control information may have different control items in the case of the first destination and in the case of the second destination, and include DPF regeneration prohibition in the case of the first destination and include DPF regeneration permission in the case of the second destination.

The pre-stored driving model may include the user driving model generated by using the driving information of the user and an external driving model generated by using each of other drivers.

The method may further include determining an external model group that match personal information when the personal information is received from the user and registering the user as the corresponding external model group, in which the external driving model among the pre-stored driving models may be a user driving model of at least one group member among group members of the external model group in which the corresponding user is registered.

The personal information used for judging the external model group may include residence (area), age, and gender and further include hobby and family members.

Another embodiment of the present invention provides a system to control a vehicle based on predicting a destination, the system including: a receiving unit that receives driving information from each vehicle; a driver identifying unit that identifies a vehicle or a driver transmitting the driving information; a destination predicting unit that determines a driving pattern through driving information which is currently received from a vehicle of a first driver, finds a driving model corresponding to the determined driving pattern in the pre-stored driving models, and judges the destination included in the found driving model as a prediction destination; and a vehicle control information generating unit that generates vehicle control information corresponding to the destination predicted by the destination predicting unit.

The pre-stored driving model may include the user driving model generated by using the driving information of the user and an external driving model generated by using each of other drivers.

The system may further include a user model learning unit that performs an operation of applying driving pattern information and the destination while the vehicle of the user arrives at the predicted destination to the user driving model, learning the user driving model, and maintaining or changing the user driving model corresponding to the corresponding driving pattern.

The user model learning unit may judge a destination of which the number of visiting times is equal to or larger than the number of setting times for the set period as a first destination, determine a destination of which the number of visiting times is smaller than the number of setting times for the set period as a second destination, and distinguish whether the destination included in the user driving model is the first destination or the second destination, when learning the user driving model.

The system may further include an external model managing unit that registers the user as a group member in an external model group having the highest association with personal information by using the person information received from the user and manages the registered external model group to be changed when the personal information is changed, in which the external driving model may be a user driving model of at least one group member among group members in the external model group in which the corresponding user is registered.

The user model learning unit may reflect the changed user driving model to the external driving model of the external model group to which the corresponding member belongs, when the user driving model is changed by learning.

The vehicle control information may have different control items in the case of the first destination and in the case of the second destination and include DPF regeneration prohibition in the case of the first destination and include DPF regeneration permission in the case of the second destination.

According to the embodiment of the present invention, even if the driver drives without setting a destination, a remote center determines vehicle control items such as diesel particle filter (DPF) regeneration or replenishment of urea suitable for a driving route or a vehicle condition for each time zone to be used by the driver to provide the determined vehicle control items to the corresponding vehicle, thereby reducing fuel consumption, preventing accidents, and the like.

Further, like long-distance high-speed driving, the customer performs a control capable of reducing an output at a time when the output is not sensitive, thereby significantly reducing customer's claims and driving disturbance.

DETAILED DESCRIPTION OF EMBODIMENTS

Figure 1:
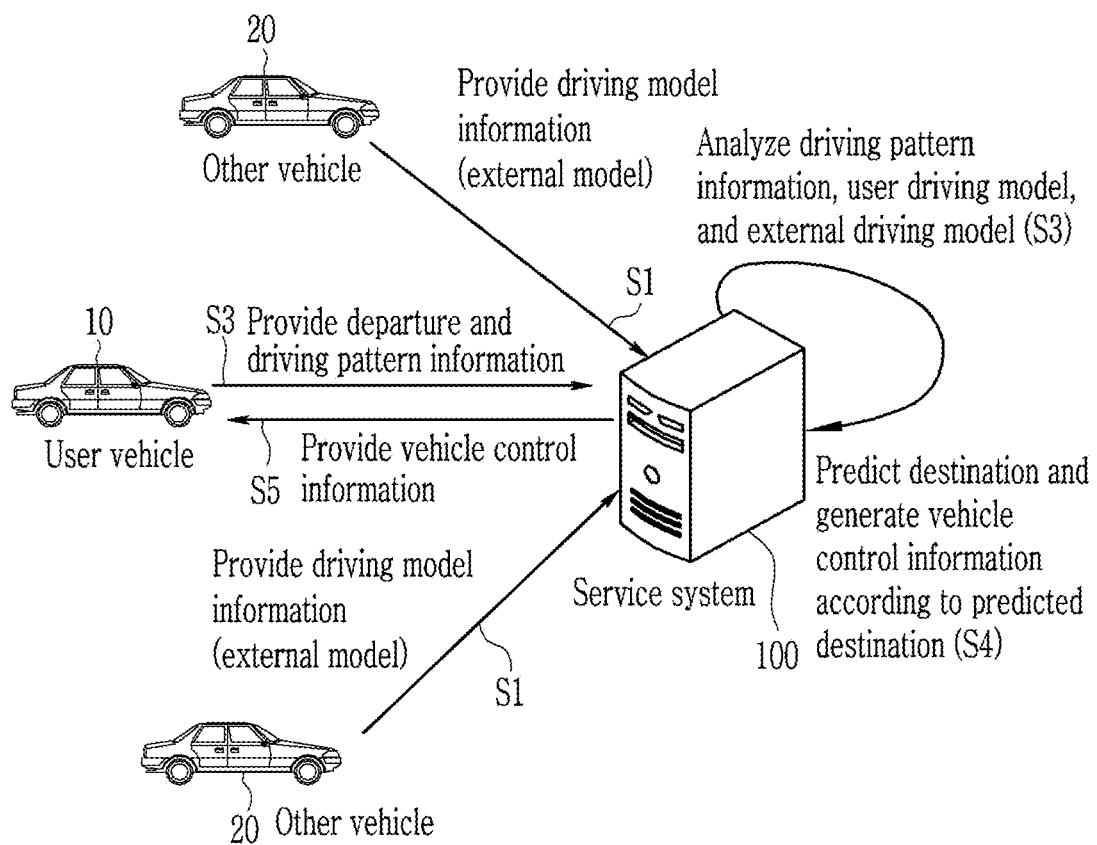
FIG. 1 is a schematic view of a service to control a vehicle based on predicting a destination according to an embodiment of the present invention.

Embodiments of the present invention will be described more fully hereinafter with reference to the accompanying drawings. As those skilled in the art would realize, the described embodiments may be modified in various different ways, all without departing from the spirit or scope of the present invention. In the drawings, parts not associated with description are omitted for clearly describing the embodiment of the present invention and like reference numerals designate like elements throughout the specification. Further, detailed description of known art which is widely known will be omitted.

Throughout the specification, unless explicitly described to the contrary, the word "comprise" and variations such as "comprises" or "comprising", will be understood to imply the inclusion of stated elements but not the exclusion of any other elements. In addition, terms including "unit", "module", and the like disclosed in the specification mean a unit that processes at least one function or operation and this may be implemented by hardware or software or a combination of hardware and software.

Hereinafter, a method and a system to control a vehicle based on predicting a destination according to embodiments of the present invention will be described with reference to the accompanying drawings.

An aspect of the invention provides a method for estimating a destination of a vehicle while driving when the driver of the vehicle has not provide a direct input of destination to a navigation system of the vehicle. A driver is driving a vehicle without entering a destination to a navigation system (or another device connected to the vehicle). A computing system (installed in the vehicle or connected to the vehicle) collects driving information of the vehicle while driving. In embodiments, the driving information includes at least one from a starting point of current drive, a route that the vehicle has traveled during the current drive, speed profile of the current drive and profile directions of the vehicle.

Driving information of the vehicle is compared with at least one predetermined driving model. In embodiments, a driving model includes a starting point, a destination, and at least one driving route from the starting point and the destination. When the driving information matches with a predetermined driving model, a computing system destination of the predetermined driving modem can be considered as a (expected) destination of the vehicle. In embodiments, when the route that the vehicle has traveled matches at least in part with a driving route of a driving model, the destination of the driving model is determined as an expected destination (predicted destination, prediction destination) of the current drive.

When an expected destination of the vehicle is determined, at least one feature of the vehicle can be controlled in accordance with at least one feature of the expected destination. In embodiments, at least one feature of the vehicle can be controlled according to remaining distance to the expected destination from current position of the vehicle.

For example, the vehicle provides a warning to the driver when a status of the vehicle (tire pressure, remaining fuel, etc.) is not appropriate for driving to the expected destination. In embodiments, a database including predetermined conditions for activate or deactivate features of the vehicle according to features of vehicle destination is available to a computing system according to embodiments of the invention. Features of the destination to control at least one function of the vehicle includes remaining distance to the destination, estimated time of arrival to the destination, one of on the principle of contact information of the destination category of the destination.

Driving information of the vehicle is monitored even after an expected destination is determined. When driving information no longer matches with the current driving model, another driving is compared with the driving information to determine a new expected destination. When the vehicle arrives at a destination, information of the drive to the destination is updated to a database of driving model associated with the vehicle. In embodiments, the aforementioned method for estimating a destination of the vehicle is performed by at least one computing system installed in the vehicle, at least one computing system outside the vehicle and combination thereof.

FIG. 1 is a schematic view of a service to control a vehicle based on predicting a destination according to an embodiment of the present invention. Referring to FIG. 1, a service to control a vehicle based on predicting a destination according to an embodiment of the present invention is a service provided in a system (hereinafter, referred to as "a service system") to control a vehicle based on predicting a destination according to an embodiment of the present invention.

The service to control a vehicle based on predicting a destination is a service that allows a corresponding vehicle to operate according to vehicle control information by predicting a destination during driving in a service system 100 (for example, a telematics center) and generating vehicle control items, that is, vehicle control information by considering a distance to the predicted destination, a nature of the destination, or the like to provide the vehicle control information to the corresponding vehicle.

Here, the nature of the destination is classified into a living destination and an activity destination.

The living destination is a destination according to repeated daily living and corresponds to a company or a store to commute to work, a large market to visit every weekend, a gym to visit frequently, a beauty salon, a cultural center, a department store, restaurants, and the like. The activity destination is a destination visited during travel or hobbies. Generally, most of the living destinations are located close to the vicinity of the residence and most of the activity destinations are located far away from the living destinations, such as using the highway.

The service system 100 uses information on other members having a high correlation with members who request the service in order to more accurately predict the destination. In this case, the correlation is determined by combining various information such as residence (area), age, gender, hobby, and family member and as both members are the same as each other in terms of the residence (area), age, gender, hobby, and family member, the correlation is higher.

The information on other members used in the service system 100 is driving model information received from other members, and the driving model collectively refers to a departure, a destination, and a moving (driving) path of the corresponding driver vehicle, and may further include various information obtained from the vehicle such as a moving time, a moving speed, a date, and a day of the week. The service system 100 determines information on when, where, and to which destination, and through which route the corresponding member drives through the information of the driving model. The driving model is classified into a user driving model, which is a driving model of a user who requests the service, and an external driving model, which is a driving model of a person other than the user.

Herein, the member means all drivers receiving the service to control the vehicle based on predicting the destination of the service system 100 and may be a driver who is registered as an actual member in the service system 100 or a driver who receives the service without being used as a member. Hereinafter, for the sake of understanding, the driver who is registered as an actual member in the service system 100 will be described.

When schematically describing a service operation in the service system 100, the service system 100 receives driving model information from each of vehicles 10 and 20 of members and accumulates and stores the driving model information (S1).

In this state, when one member (hereinafter, referred to as "a user") starts up and starts driving, the user vehicle 10 generates driving information including a current position, a moving route, a moving time, a driving speed, a RPM, and the like and continuously provides the generated driving information to the service system 100 (S2).

The service system 100 identifies the member through member identification information (or vehicle identification information) included in the driving information whenever receiving the driving information, continuously determines a driving pattern through the driving information, and analyzes a user driving model corresponding to the driving pattern and an external driving model to find the driving model corresponding to the determined driving pattern (S3).

Herein, the driving pattern is a form in which the driver uses the vehicle, which is determined by a vehicle use time, a use road, a driving route, a vehicle speed, and the like. For example, if the user goes to work with a vehicle every day, the user moves the vehicle to a company at a similar time zone every day, and a road, a driving route, and a driving time which are used at that time are learned because being not largely different every day or even though being different, a new road is not used every day. Therefore, when the vehicle use time, the use road, the moving time, and the like are determined, the driving pattern which may determine which destination the user moves may be determined.

The service system 100 determines the destination of the driving model corresponding to the driving pattern as a prediction destination, generates vehicle control information corresponding to the prediction destination (S4), and provides the generated vehicle control information to the user vehicle 10 (S5).

In this case, the vehicle control information may be received from a communication device in the vehicle, or received from a navigation device or a user mobile in association with the vehicle. The vehicle control information includes information indicating whether or not the DPF can be regenerated, information indicating whether or not urea is replenished, information on parts requiring replenishment, information on diagnostic items or parts requiring safety inspection, battery SOC management information for preventing deterioration of fuel economy and output for long distance driving, and the like.

When the user vehicle 10 receives the vehicle control information from the service system 100, the user vehicle 10 performs an operation according to the received vehicle control information.

Hereinafter, the service system 100, that is, the system 100 to control the vehicle based on predicting the destination according to the embodiment of the present invention will be described with reference to FIG. 2.

Figure 2:
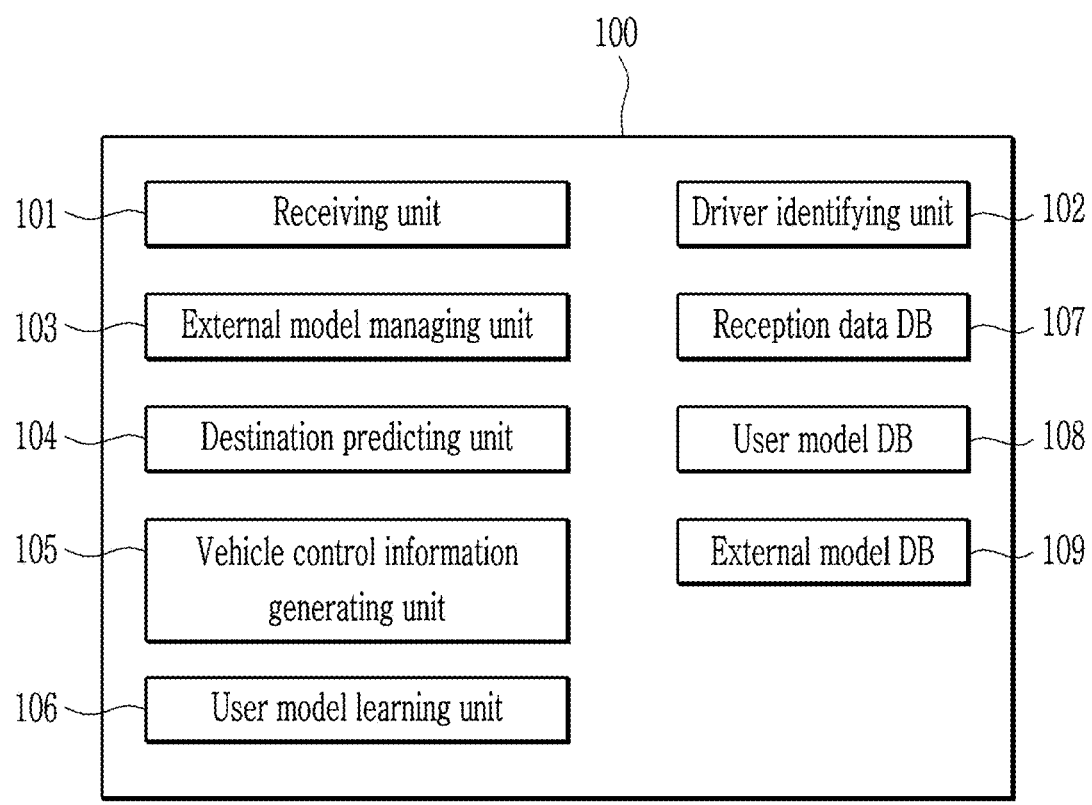
FIG. 2 is a block diagram of a system to control a vehicle based on predicting a destination according to another embodiment of the present invention.

FIG. 2 is a block diagram of a system to control a vehicle based on predicting a destination according to another embodiment of the present invention. Referring to FIG. 2, the service system 100 includes a receiving unit 101, a driver identifying unit 102, an external model managing unit 103, a destination predicting unit 104, a vehicle control information generating unit 105, a user model learning unit 106, a reception data DB 107, a user model DB 108, and an external model DB 109.

The receiving unit 101 communicates with a communication apparatus of the vehicle, receives the driving information from each vehicle, and provides the vehicle control information to each vehicle. The user joins to be member through the receiving unit 101 by using a mobile device, a computer, or an electronic device mounted in the vehicle. The driver identifying unit 102 identifies a member (driver) transmitting the received driving information by determining member identification information (e.g., vehicle identification information, navigation identification information, mobile phone number, etc.) included in the received driving information.

The external model managing unit 103 determines an external model group belonging to each member by using personal information for each member, registers the external model group to correspond to the member identification information together, and manages the external model group to be changed when the personal information is changed.

The external model group is a group classified for determining the association with others and is classified based on various information such as a residence (area), age, gender, hobby, and family members of the corresponding member. That is, people with the same residence (area), age, gender, hobby, and family members become the same group members, and then if even any one of the residence (area), age, gender, hobby, and family members is changed, the group is changed to another external model group. Here, elements that distinguish the external model group are not limited to the residence (area), age, gender, hobby, family members, etc., and may be arbitrarily selected for each manufacturer or other elements may be added or changed.

The destination predicting unit 104 determines the driving pattern through the received driving information, finds the driving model corresponding to the determined driving pattern in the user driving model or the external driving model of the external model group to which the user belongs, and judges the destination included in the found driving model as the prediction destination and then judges whether the judged prediction destination is a living destination or an activity destination. In this case, the number of the driving models corresponding to the driving pattern may be multiple, and in this case, the destination predicting unit 104 selects a driving model having the highest similarity to the driving pattern among the plurality of driving models. Meanwhile, the destination predicting unit 104 may additionally use the similarity to the user's age, residence, age, gender, hobby, family members, etc. among the plurality of driving models when selecting one driving model.

The vehicle control information generating unit 105 judges whether the destination is the living destination or the activity destination and generates vehicle control information according to a characteristic of the destination. Classification information on whether the destination is the living destination or the activity destination is included in the driving model. The vehicle control information generating unit 105 may use the moving route included in the driving model, use real time traffic information, or use consumable state information of the corresponding vehicle at the time of generating the vehicle control information. Of course, the vehicle control information generating unit 105 may pre-register the vehicle control information corresponding to the current position and the destination and extract the registered vehicle control information by using the predicted destination and the current position to provide the extracted vehicle control information to the corresponding vehicle.

When the user's vehicle arrives at a predicted destination as a result of providing the service according to the received driving information, the user model learning unit 106 applies and learns the driving information and the destination during that time to the existing user driving model and learns the driving information and the destination to perform an operation of maintaining or changing the driving model corresponding to each driving pattern. Further, the user model learning unit 106 determines whether the destination of each driving model is the living destination or the activity destination, with respect to the driving model of each driving pattern at the time of learning the driving pattern and records the determined information.

The user model learning unit 106 uses the number of setting times during a set period as a criterion for judging whether the destination is the living destination or the activity destination. For example, when the set period is one week and the number of setting times is two, the user model learning unit 106 judges the same destination which is visited two times or more for one week as the living destination and judges other destinations as the activity destinations. In this case, the set period is set to two weeks, one month, or the like to judge whether the destination is the living destination and the number of setting times may also be arbitrarily set by the manufacturer. In addition, the number of the setting times may be varied based on previous visiting records.

Of course, the distance may be used as an additional judgment criterion. For example, when a distance of the destination which is visited once a weak is close to a main distance (alternatively, a garage), the corresponding destination is judged as the living destination. The cases of visiting restaurants, large markets, or department stores may correspond to the living destination.

The learned driving model is stored in the user model DB 108 of the corresponding user and stored in the external model DB 109 in response to the external model group in which the corresponding user is registered. The user model learning unit 106 uses a normal machine learning algorithm and uses, for example, a recurrent neural network (RNN) which is a deep learning algorithm among the machine learning methods.

The reception data DB 107 stores driving information of each member vehicle received through the receiving unit 101, the user model DB 108 stores a user driving model for each driving pattern for each member, and the external model DB 109 stores a user driving model of each member for each driving pattern for each external model group.

Figure 3:
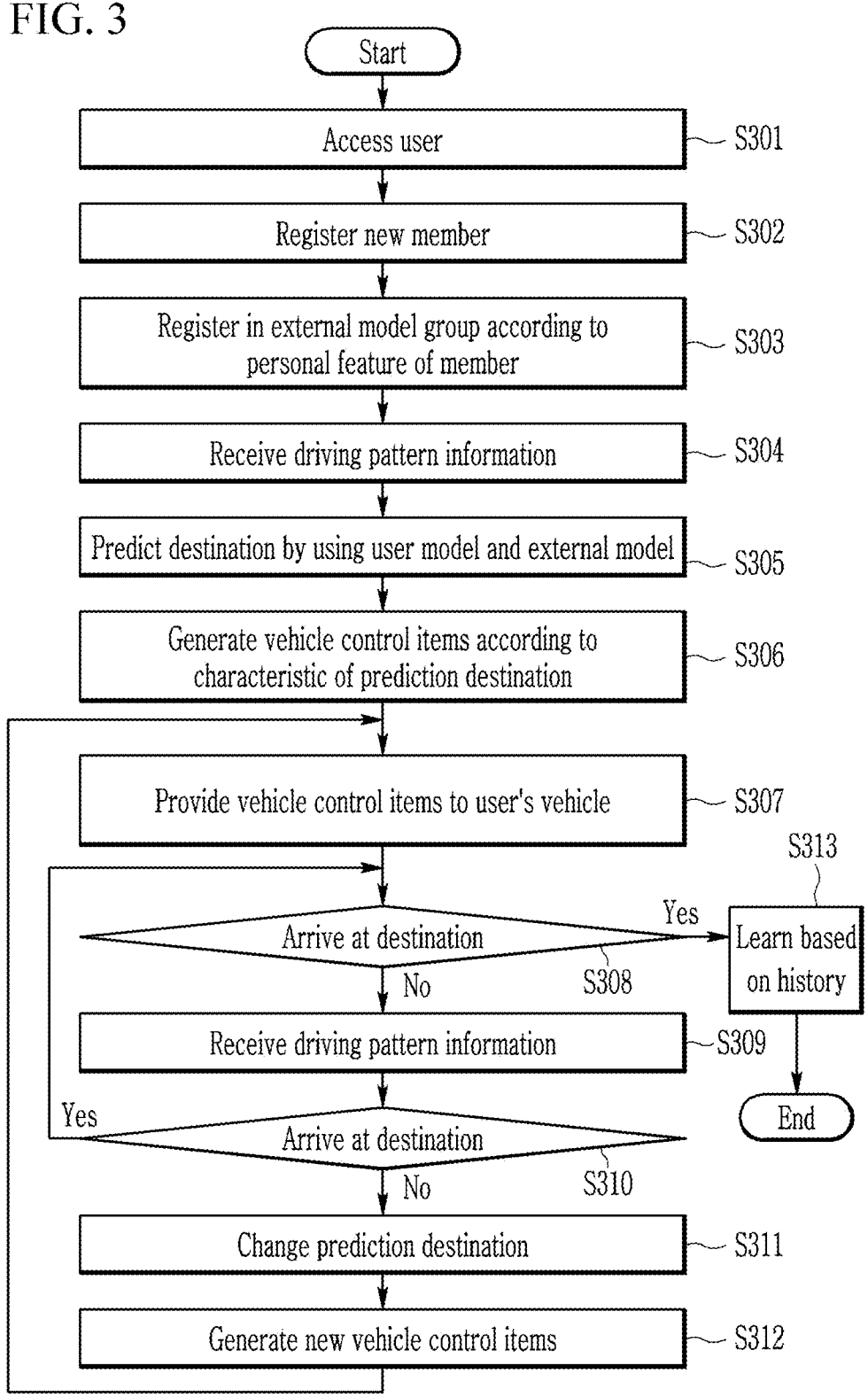
FIG. 3 is a schematic flowchart of a method to control a vehicle based on predicting a destination according to yet another embodiment of the present invention.

Hereinafter, a schematic operation for the method to control the vehicle based on predicting the destination performed in the service system 100 will be described with reference to FIG. 3. FIG. 3 is a schematic flowchart of a method to control a vehicle based on predicting a destination according to yet another embodiment of the present invention.

Referring to FIG. 3, when the user accesses the service system 100 (S301) and requests a new member registration, the service system 100 receives personal information (e.g., residence (area), age, gender, hobby, family members, a kind and specifications of the vehicle, replacement information on consumables, and the like) and registers the user as a new member (S302). Next, the service system 100 determines an external model group that matches the personal information of the newly registered member and registers the user as the determined external model group (S303).

When the service system 100 receives the driving information from a first member's vehicle (S304), the service system 100 determines a driving pattern through the accumulated and stored driving information, determines a driving model having the most similar driving pattern to the determined driving pattern by using the user driving model and the external driving model, and determines the destination of the determined driving model as the prediction destination (S305).

When predicting the destination, the service system 100 generates vehicle control information, that is, vehicle control items according to whether the predicted destination is the living destination or the activity destination (S306) and provides list information in which the vehicle control items are recorded to the first member's vehicle (S307).

When the driving information is continuously received from the first member's vehicle (S309), the service system 100 judges whether the current driving route is on the driving route to the prediction destination (that is, the predicted driving route) through the received driving information (S310). The service system 100 judges that the vehicle is proceeding to the predicted destination which is judged to be driving to the predicted route and judges that the vehicle does not proceed to the predicted destination if the vehicle is not driving to the predicted route.

According to the judgment, the service system 100 judges whether the vehicle arrives at the destination when the vehicle is driving to the predicted route, determines a new prediction destination through the judged driving pattern by using the received driving information when it is judged that the vehicle does not proceed to the predicted destination (S311), and generates and provides vehicle control information corresponding to the new prediction destination (S312 and S307). In this case, when the new prediction destination is the same living destination or activity destination or the generated vehicle control information is the same as the previously generated vehicle control information, the operation of providing the vehicle control information to the first member's vehicle is not required.

Meanwhile, the service system 100 judges that the vehicle arrives at the destination if the driving information is not received for the set period (S308), learns the user driving model of the first member by using the currently received driving information and the final prediction destination, and updates the information on the user model DB 108 and the external model DB 109 for the first member if the information of the driving model is changed by the learning (S313).

Hereinafter, an operation according to whether the predicted destination is the living destination or the activity destination will be separately described with reference to FIGS. 4 and 5.

Figure 4:
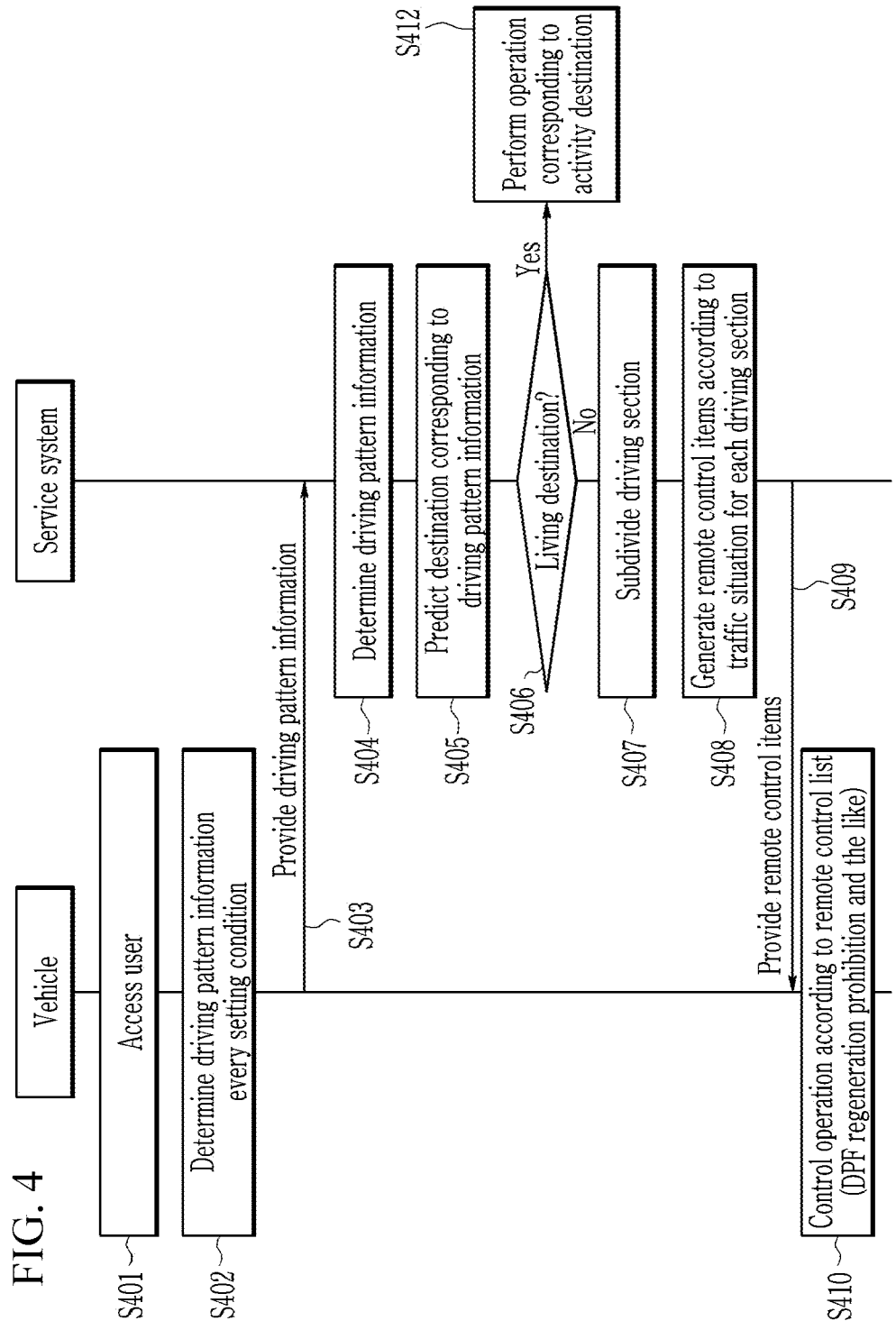
FIG. 4 is a flowchart corresponding to a living destination in the method to control the vehicle based on predicting the destination according to yet another embodiment of the present invention.

FIG. 4 is a flowchart corresponding to a living destination in the method to control the vehicle based on predicting the destination according to yet another embodiment of the present invention. Referring to FIG. 4, when the user starts up and starts driving (S401), the vehicle determines the driving information for each setting condition (S402) and provides the determined driving information to the service system 100 (S403). In this case, if the setting condition may be a set period time or a condition that to pass through a point where the road is branched, such as an intersection in the case of using a navigation function. According to the navigation technique, the road is represented by a link and a node, the node represents the start and the end of the road as information indicating the junction of the road, and the link represents a road connecting two nodes. Therefore, in the case of using the navigation function, the vehicle determines driving information in the case of passing the node or meeting a new node.

The service system 100 determines the received driving information (S404), determines one driving model corresponding to the currently determined driving pattern by using the user driving model, and then determines the destination of the driving model as a prediction destination (S405). In addition, the service system 100 judges whether the predicted destination is a living destination (S406). Meanwhile, if there is no driving model corresponding to the currently determined driving pattern among the user driving models, the service system 100 determines an external model group of the user and then determines one driving model corresponding to the driving pattern by using the external driving model corresponding to the corresponding external model group.

If the predicted destination is the living destination, the service system 100 determines the driving route from the current position to the prediction destination through the driving route included in the corresponding driving model and subdivides the driving section (S407), and determines and generates vehicle control items which are advantageous for fuel consumption and driving performance by considering a slop, traffic lights, a real time traffic situation and the like (S408).

The generated vehicle control items are provided to the vehicle (S409) and the corresponding vehicle controls the vehicle operation according to the received vehicle control items (S410). For example, if there is a control item to prevent the DPF regeneration from being performed in the vehicle control items according to a short driving period, the service system 100 needs to perform the DPF regeneration according to the set operating condition of the vehicle, but does not perform the DPF regeneration according to a DPF regeneration prohibition command.

Figure 5:
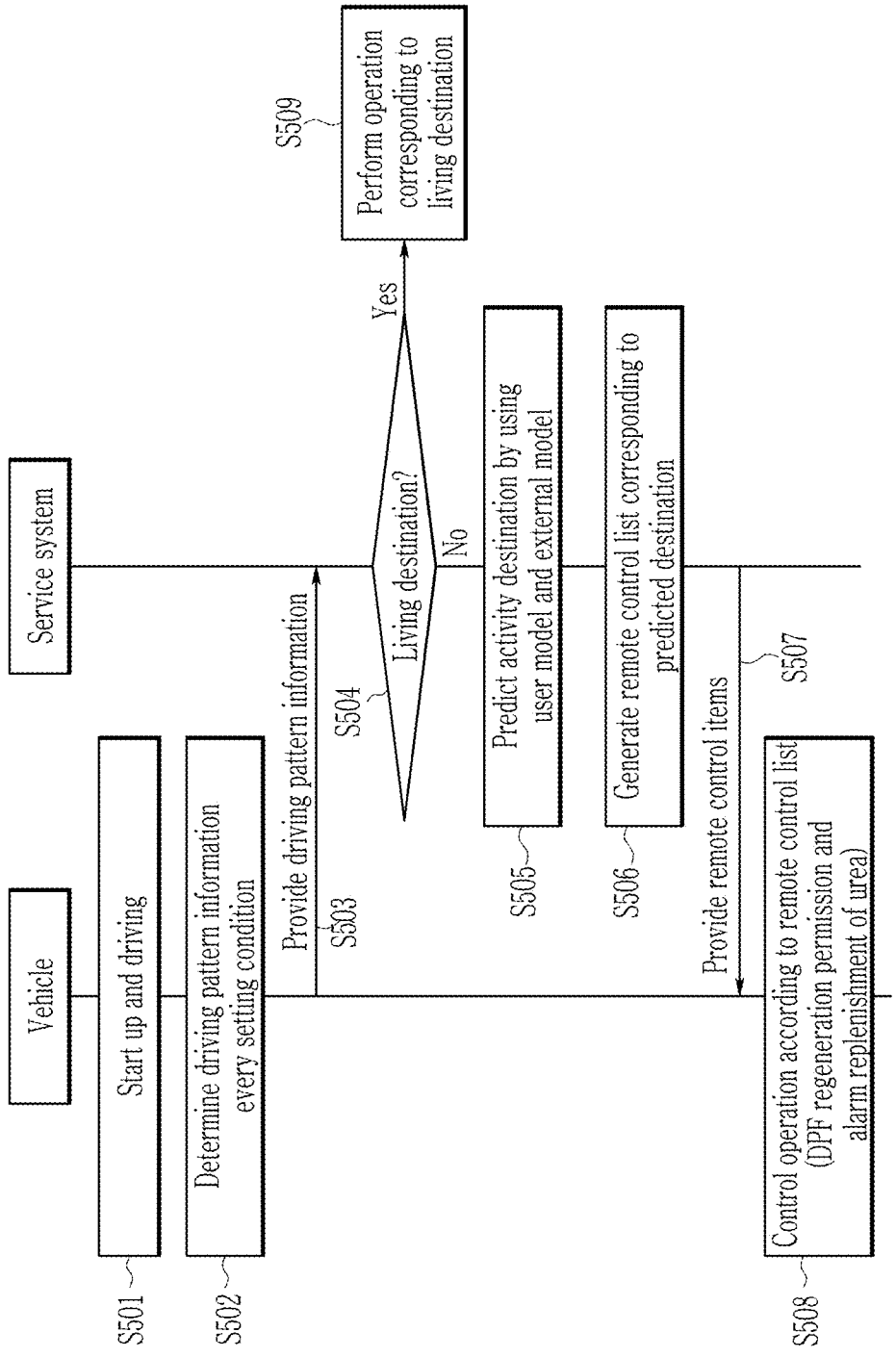
FIG. 5 is a flowchart corresponding to an activity destination in the method to control the vehicle based on predicting the destination according to yet another embodiment of the present invention.

FIG. 5 is a flowchart corresponding to an activity destination in the method to control the vehicle based on predicting the destination according to yet another embodiment of the present invention. Referring to FIG. 5, when the user starts up and starts driving (S501), the vehicle determines driving information for each setting condition (S502) and provides the determined driving information to the service system 100 (S503).

The service system 100 determines the received driving information, determines one driving model corresponding to the currently determined driving pattern by using the user driving model, determines the destination of the driving model as a prediction destination, and then judges whether the predicted destination is the living destination (S504).

The service system 100 judges the predicted destination as the activity destination instead of the living destination (S505) and determines and generates the vehicle control items corresponding to the activity destination (S506).

The generated vehicle control items are provided to the vehicle (S507), and the corresponding vehicle controls the vehicle operation according to the received vehicle control items (S508). For example, if there is a control item to permit DPF regeneration in the vehicle control items according to a short driving period, the service system 100 performs the DPF regeneration if the set operating condition of the vehicle is satisfied. As another example, when long-distance driving is impossible in case of insufficient capacity such as the urea, or there is a component having a danger to safety, if there is a control item such as a urea replenishing command (urea replenishment warning) in the control items, the vehicle displays the corresponding control item to allow the user to respond to the displayed control item.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

<Description of symbols>

10, 20: Vehicle
100: Service system
101: Receiving unit
102: Driver identifying unit
103: External model managing unit
104: Destination predicting unit
105: Vehicle control information generating unit
106: User model learning unit
107: Receiving data DB
108: User model DB
109: External model DB

What is claimed is:

1. A method of controlling a vehicle based on predicting a destination, the method comprising:
   determining a driving pattern by using driving information received from a vehicle of a user;
   determining a user driving model corresponding to the driving pattern among pre-stored driving models;
   determining a destination of the determined user driving model as a predicted destination;
   generating vehicle control information corresponding to the predicted destination;
   performing a vehicle operation according to the vehicle control information by providing the vehicle control information to the vehicle;
   applying, when the vehicle arrives at the predicted destination, driving pattern information of the vehicle while driving to the predicted destination and the destination to the pre-stored user driving model;
   learning the user driving model at least by determining a destination of which the number of visiting times is equal to or larger than the number of setting times for a set period as a first destination, determining a destination of which the number of visiting times is smaller than the number of setting times for the set period as a second destination, and distinguishing whether the destination included in the user driving model is the first destination or the second destination; and
   maintaining or changing the pre-stored user driving model corresponding to the driving pattern,
   wherein the vehicle control information includes DPF regeneration prohibition in the case of the first destination and includes DPF regeneration permission in the case of the second destination.

2. The method of claim 1, wherein:
   the number of the setting times used as a criterion for judging whether the destination is the living destination or the activity destination is varied based on previous visiting records.

3. The method of claim 1, wherein:
   the vehicle control information has different control items in the case of the first destination and in the case of the second destination.

4. The method of claim 1, wherein:
   the pre-stored driving models include the user driving model generated by using the driving information of the user and an external driving model generated by using driving information of each of other drivers.

5. The method of claim 4, further comprising:
   determining an external model group that matches personal information received from the user and registering the user as the corresponding external model group,
   wherein the external driving model among the pre-stored driving models is a user driving model of at least one group member among group members of the external model group in which the corresponding user is registered.

6. The method of claim 5, wherein:
   the personal information used for judging the external model group includes residence (area), age, and gender and further includes hobby and family members.

7. A system for controlling a vehicle based on predicting a destination, the system comprising:
   a receiving unit configured to receive driving information from each vehicle;
   a driver identifying unit configured to identify a vehicle or a driver transmitting the driving information;
   a destination predicting unit configured to determine a driving pattern through driving information which is currently received from a vehicle of a first driver, find a user driving model corresponding to the determined driving pattern among pre-stored driving models, and judge the destination included in the found user driving model as a predicted destination;
   a vehicle control information generating unit configured to generate vehicle control information corresponding to the destination predicted by the destination predicting unit; and
   a user model learning unit configured to apply, when the vehicle arrives at the predicted destination, driving pattern information of the vehicle while driving to the predicted destination and the destination to the user driving model, learn the user driving model, and maintain or change the user driving model corresponding to the driving pattern,
   wherein the user model learning unit judges a destination of which the number of visiting times is equal to or larger than the number of setting times for the set period as a first destination, determines a destination of which the number of visiting times is smaller than the number of setting times for the set period as a second destination, and distinguishes whether the destination included in the user driving model is the first destination or the second destination, when learning the user driving model,
   wherein the vehicle control information has different control items in the case of the first destination and in the case of the second destination, and wherein the vehicle control information includes DPF regeneration prohibition in the case of the first destination and includes DPF regeneration permission in the case of the second destination.

8. The system of claim 7, wherein:

the pre-stored driving models include the user driving model generated by using the driving information of the user and an external driving model generated by using each of other drivers.

9. The system of claim 7, further comprising:

an external model managing unit configured to register the user as a group member in an external model group having the highest association with personal information received from the user, and manage the registered external model group to be changed when the personal information is changed, wherein the external driving model is a user driving model of at least one group member among group members in the external model group in which the corresponding user is registered.

10. The system of claim 9, wherein:

the user model learning unit reflects the changed user driving model to the external driving model of the external model group to which the corresponding member belongs, when the user driving model is changed by learning.

* * * * *